United States Patent [19]

Stauffer

[11] 4,230,942
[45] Oct. 28, 1980

[54] CROSSED CYLINDRICAL LENS

[75] Inventor: Norman L. Stauffer, Englewood, Colo.

[73] Assignee: Honeywell Inc., Minneapolis, Minn.

[21] Appl. No.: 23,866

[22] Filed: Mar. 26, 1979

[51] Int. Cl.³ ............................................... G01J 1/36
[52] U.S. Cl. ...................................... 250/204; 350/167
[58] Field of Search ............... 250/201, 204, 216, 578; 354/25; 350/167

[56] References Cited

U.S. PATENT DOCUMENTS

| | | | |
|---|---|---|---|
| 4,035,579 | 7/1977 | Roberts | 350/167 |
| 4,117,325 | 9/1978 | Holle et al. | 250/204 |
| 4,185,191 | 1/1980 | Stauffer | 354/25 |

*Primary Examiner*—David C. Nelms
*Attorney, Agent, or Firm*—Charles J. Ungemach

[57] ABSTRACT

A lenslet array for use in a distance determining system. The array utilizes a plurality of cylindrical lenslets arranged in parallel relation with a crossed cylindrical lens arranged transverse to the lenslets and lying in a plane parallel to the plane of the lenslets. The focal lengths of the lens and the lenslets are chosen so that they project an oblong image in a common image plane. Elongated radiation detectors are positioned within the oblong image.

11 Claims, 10 Drawing Figures

CROSSED CYLINDRICAL LENS

BACKGROUND OF THE INVENTION

The present invention relates generally to a lenslet array and more particularly to an improvement of the lenslet arrangement found in my copending application Ser. No. 912,688, filed June 5, 1978, now U.S. Pat. No. 4,185,191 my copending application Ser. No. 023,865, filed Mar. 26, 1979, and the copending application of Stauffer and Wilwerding, Ser. No. 16,595, filed Mar. 1, 1979 wherein lenslets are used in connection with distance determining or automatic focusing of, for example, photographic or television cameras.

In the above-mentioned copending application, radiation from a remote scene to be focused upon, is directed by an objective lens to a plurality of lenslets mounted proximate the image plane of the objective lens. Each lenslet produces an image of the exit pupil of the objective lens and proximate the image plane of each lenslet is mounted a pair of radiation sensitive detectors. Each detector produces an output indicative of the radiation it receives and when the objective lens is properly positioned in the desired focus position, the detectors in each pair will receive approximately the same amount of radiation. As the objective lens moves from a proper focus position, the output of the detectors becomes unequal. The inequality in outputs of the detectors is analyzed by a system to determine the direction the objective lens must be moved to attain a proper focus.

In the above copending application, the image produced by the lenslets is circular in nature or, if the lens is stopped down during the focussing operation, is the shape of the iris mechanism and this image changes in size as lenses of different f numbers are used or as the iris mechanism is opened and closed. To operate properly, the detectors must be placed within the periphery of the smallest of the images to be encountered and thus the detectors are restricted in size. It is desirable to have detectors of as large a surface area as possible so as to increase the outputs thereof but with the generally circular configuration of the image of the exit pupil of the objective lens and its varying size, the amount of surface area available for the detectors is reduced. The circular or spherical shape of the lenslets used in the arrays of the above-referred to copending application has, because of their very small size, been found difficult to manufacture in tiny arrays with good accuracy.

SUMMARY OF THE INVENTION

The present invention provides for a lenslet array employing crossed cylindrical lenses so that the magnification of the radiation coming from the objective lens is focused by two sets of lenses which lie transverse to one another and in the embodiment shown herein are arranged orthogonally in parallel planes and having different focal lengths so that the result is a image in the image plane of the lenslets which is oblong in shape thus permitting the detectors to be mounted along the long dimension of the oblong and thereby increasing the surface area available for sensing radiation. Another advantage in using the crossed cylindrical configuration is in ease of production of the lenslets since small cylindrical lenses are easier to form than spherical lenses of the above-referred to copending applications.

DETAILED DESCRIPTION OF THE PREFERRED EMBODIMENTS

Figure 1:
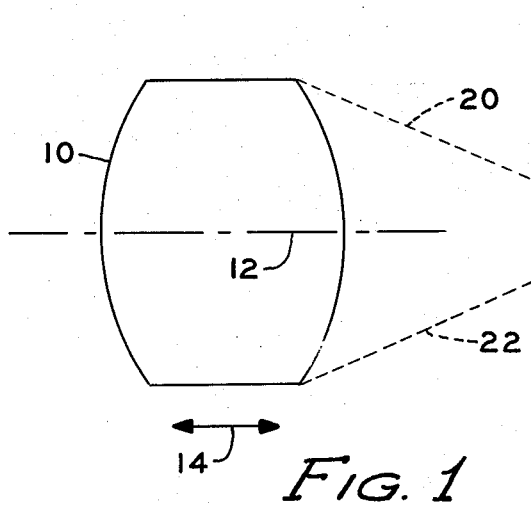
FIG. 1 shows the objective lens and lenslet array of the above-mentioned copending applications.

In FIG. 1, a lens 10, representing the objective lens of an optical system or the taking lens of a camera, is shown having an axis 12 along which lens 10 is moveable in the direction shown by arrows 14. Lens 10 receives radiation from a scene being viewed at the left in FIG. 1 and directs the radiation towards the right to a lenslet array 16 mounted proximate the image plane of lens 10. Radiation from the lens 10 is shown being directed to the lenslet array along paths such as is shown by dashed lines 20 and 22. Lenslet array 16 is shown having a right hand surface composed of a plurality of lenslets such as those identified by reference numeral 26 and behind each lenslet to the right are a pair of dots representing radiation sensitive detectors such as are identified by reference numeral 28. Each lenslet is spherical in shape and thus produces an image at the plane of detectors 28 which is of the same magnification along the horizontal and vertical axes. The images are shown as circular but, as mentioned above, may have the general shape of the iris mechanism for objective lens 10, for example, octagonal. The first surface 32 of lenslet array 16 is shown to be flat, but a corrector lens arrangement such as is shown in my above-referred to copending application Ser. No. 023,865, may be used so that the detectors at the end of the array may receive radiation in equal amounts from the end lenslets when the objective lens is in a proper focus position. As lens 10 moves along axis 12 out of a proper focus position, the radiation received by the individual detectors associated with each change and analyzing circuitry connected to the detectors, is used to produce a signal indicative of the direction which lens 10 must be moved to achieve a proper focus position. This signal may either be used for indicating the out-of-focus condition or to drive a motive means to reposition lens 10 at the proper focus position.

Figure 2:
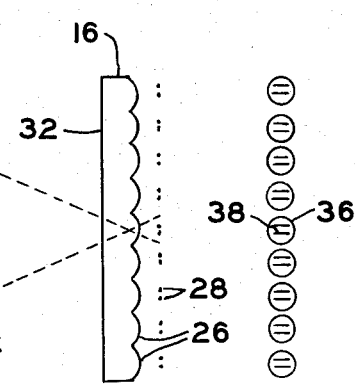
FIG. 2 shows the images produced by the individual lenslets of FIG. 1 with the detectors mounted therein.

FIG. 2 shows the image plane of detectors such as 28 of FIG. 1 and it is seen that each lenslet produces a generally circular image of the exit pupil of lens 10 with the detectors mounted in pairs substantially in the middle portion of each exit pupil image. In FIG. 2, only one exit pupil image 36 and one pair of detectors 38 has been given a reference numeral for simplicity in the drawing.

Figure 3:
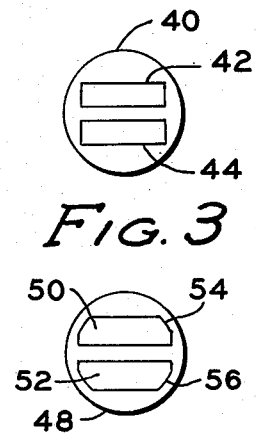
FIG. 3 shows an enlarged view of one of the images of FIG. 2 with the detectors mounted therein.

FIG. 3 shows an enlargement of one of the images of FIG. 2 which image has been identified by the reference numeral 40 and mounted therein is a first detector 42 and a second detector 44 substantially equally spaced around the center of the image 40. It is seen in FIG. 3 that for rectangular detectors which, are easiest to manufacture, the size of the detectors is limited by the area available within the image 40. Since the size of the detectors is directly related to the magnitude of the output signal it is capable of producing, it is desirable to have these of as large an area as possible.

Figure 4:
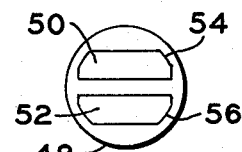
FIG. 4 shows an enlarged view of one of the images of FIG. 2 with an alternate shaping of the detectors.

FIG. 4 shows another image of the exit pupil identified with reference numeral 48. Mounted in image 48 are a pair of detectors 50 and 52 which have slightly increased area over those of FIG. 3 by virtue of the trimming of the outer corners of the rectangle as at 54 and 56. By using the detector arrangement of FIG. 4, an increased area is possible without appreciably increasing the difficulty in manufacture of the detectors. Ideally, semicircular detectors would be used, but manufacture of semicircular radiation responsive materials has been found to be impractical.

Figure 5:
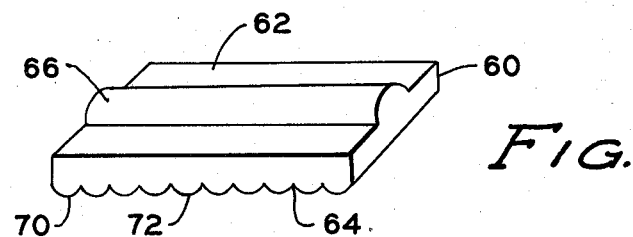
FIG. 5 shows a perspective view of the crossed cylindrical lenses of the present invention.

FIG. 5 shows a perspective view of a crossed cylindrical lens arrangement for the lenslet array 16 of FIG. 1 which, when used, produces an image allowing greater area of detector material to be employed. In FIG. 5, a block of transparent material 60 is shown having an upper surface 62 and a lower surface 64. In the center of the upper surface 62, a cylindrical lens 66 has been formed which extends from left to right across the length of block 60. Along the lower surface 64 a plurality of cylindrical lenses such as 70 and 72 has been formed, each of which extends orthogonally to the cylindrical lens 66 across the width of block 60. Cylindrical lens 66 has a first focal length and each of the cylindrical lenses such as 70 and 72 has a second focal length so that radiation passing through block 60 is focused by the lenses at the same image plane but with the image being magnified in one direction by a different amount than it is magnified in the other direction.

Figure 6:
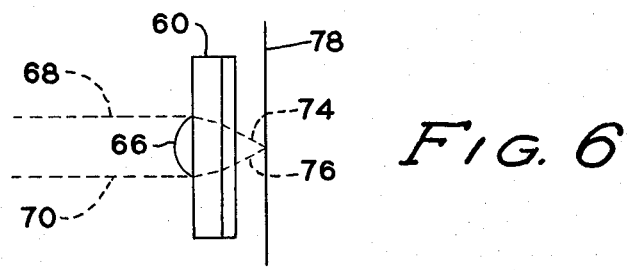
FIG. 6 shows an end view of the lenslet arrangement of FIG. 5.

FIG. 6 shows an end view of block 60 with the upper surface cylindrical lens 66 receiving radiation from the left along paths such as shown by dashed lines 68 and 70. This radiation is focused by cylindrical lens 66 along paths such as shown by dashed lines 74 and 76 to an image plane 78.

Figure 7:
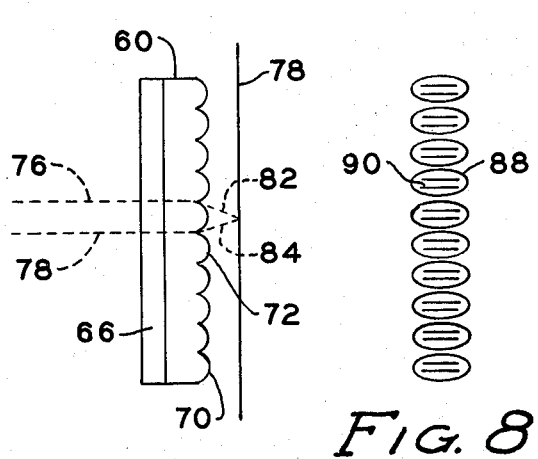
FIG. 7 shows a side view of the lenslet arrangement of FIG. 5.

FIG. 7 shows a side view of the block 60 with the individual lenslets such as 70 and 72 along the right hand side. Radiation which has passed through the cylindrical lens 66 along paths such as is shown by dashed lines 76 and 78 is focused by the lenslets such as 70 and 72 along paths such as shown by dashed lines 82 and 84 to the image plane 78. The focal length of the individual lenslets such as 70 and 72 is shorter than the focal length of the cylindrical lens 66 by an amount necessary to cause the image produced by both lenses to occur at the same plane 78.

Figure 8:
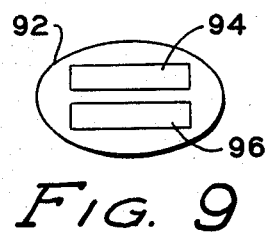
FIG. 8 shows the images produced by the individual lenslets of FIG. 5 with the detectors mounted therein.

FIG. 8 shows a view of the image plane 78 with the images of the exit pupil of the objective lens shown as oblong images or ovals such as 88. Detector pairs such as 90 are shown mounted within each of the oval images of the exit pupil of the objective lens and as can be seen by comparing FIG. 8 with FIG. 2, the length of these detectors is now able to be increased.

Figure 9:
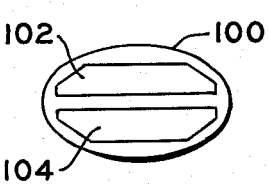
FIG. 9 shows an enlarged view of one of the images of FIG. 8 with the detectors mounted therein.

FIG. 9 shows an enlarged view of one of the oblong images of FIG. 8, identified by reference numeral 92, and mounted in the center of the oval image 92 are a pair of detectors 94 and 96. As will be seen by comparing FIG. 9 with FIG. 3, the size of the surfaces of detectors 94 and 96 has been significantly increased so that greater amounts of output signal are now available for use by the analyzing system.

Figure 10:
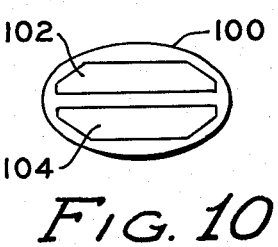
FIG. 10 shows an enlarged view of one of the images of FIG. 8 with an alternate shaping of the detectors.

FIG. 10 shows another enlargement of one of the oblong images of FIG. 8, identified by reference numeral 100, with detectors 102 and 104 mounted therein. It is seen that detectors 102 and 104 are somewhat larger than the detectors of FIG. 9 by virtue of having their corners trimmed in a manner similar to that described in connection with FIG. 4. Again, while in both FIGS. 9 and 10 the images are shown to be oval, their actual shape, if the objective lens is stopped down during focussing, may be an elongated image of the iris mechanism.

It is, therefore, seen that I have provided a lens arrangement which may be utilized with a distance determining system to increase the size of the image of the exit pupil of the objective lens of such system in order to enable larger area detectors to be utilized and thus increase the output available for the range determining system. Many changes or modifications will occur to those skilled in the art. For example, while I have shown a single crossed cylindrical lens, two or more of such lenses may be used with the cylindrical lenslets so that a number of sets of oblong images of the objective lens exit pupil are formed and while I have shown 10 lenslets in the array, the actual number of lenslets will vary with the application and normally will include 20 to 40 lenslets for the system. Also, while I have shown the crossed cylindrical lenses to be formed as a unitary structure, the two sets of lenses may be constructed separately. Furthermore, while I have shown the crossed lenses to lie perpendicular to one another, the lenses may traverse or cross each other at different angles so as to produce oblong images of other shapes. Likewise, while I have omitted the corrector lens described in connection with my copending application Ser. No. 023,865, such a corrector lens may be employed in the present invention as, for example, a spherical or cylindrical lens located between the objective lens and the lenslet array, to assure that the radiation eminating from the end detectors of the array emerges generally along the axis thereof so that the individual detectors in the image of the lenslets will receive substantially equal amounts of radiation when the objective lens is in the proper focus position. Accordingly, I do not wish to be limited by the specific showings made in connection with the preferred embodiments described herein, but rather intend only to be limited by the appended claims.

The embodiments of the invention in which an exclusive property or right is claimed are defined as follows:

1. In apparatus for use in an optical system having an objective lens, the objective lens having an optic axis and producing an image of a remote scene at an image plane, lenslets means mounted proximate the image plane and operable to produce an image of the exit pupil of the objective lens and radiation detector means mounted within the image of the exit pupil, the improvement comprising:

a first cylindrical lens forming a part of the lenslet means, said first cylindrical lens extending in a first direction on a first plane substantially perpendicular to the optic axis; and a plurality of second cylindrical lenses forming a part of the lenslet means spaced from said first cylindrical lens along the optic axis and extending in a second direction on a second plane substantially perpendicular to the optic axis and transverse to the first direction so that the image of the exit pupil is oblong.

2. Apparatus according to claim 1 wherein said radiation detector means comprises a plurality of elongated radiation sensitive surfaces mounted side by side in pairs with the long dimension of each pair lying generally in the long dimension of the oblong exit pupil image.

3. Apparatus according to claim 2 wherein the radiation sensitive surfaces are rectangular.

4. Apparatus according to claim 2 wherein the radiation sensitive surfaces are rectangular with two corners trimmed to approximate the shape of the image of the exit pupil.

5. Apparatus according to claim 1 wherein the focal length of said first cylindrical lens is different than the focal length of said plurality of second cylindrical lenses by an amount sufficient to assure a common image plane.

6. Apparatus according to claim 5 in which the focal length of said cylindrical lenslets differs from the focal length of said cylindrical lens by an amount sufficient for said lenslets and said lens to have a common image plane.

7. Apparatus of the class described comprising:

an objective lens having an optic axis and a first image plane; and a lenslet array mounted proximate the image plane and comprising a plurality of cylindrical lenslets arranged in side by side relation along substantially parallel axes, a cylindrical lens arranged proximate to said plurality of lenslets along an axis which is transverse to the axes of said lenslets and lying in a plane parallel thereto, said lenslet array producing at a second image plane a plurality of images of the exit pupil of said objective lens which images are oblong in shape.

8. Apparatus according to claim 7 including radiation detector means mounted proximate said second image plane.

9. Apparatus according to claim 8 wherein said detector means comprises a plurality of radiation detectors arranged in pairs with each pair mounted within a different image of the exit pupil of the objective lens.

10. Apparatus according to claim 9 wherein the radiation detectors are rectangular in shape with their long dimension lying parallel to the long dimension of the oblong shaped image of said objective lens.

11. Apparatus according to claim 10 wherein two corners of each of the rectangularly shaped radiation detectors is removed to approximately conform to the oblong shaped image of said objective lens.

* * * * *